United States Patent
Flaig et al.

(10) Patent No.: US 11,407,198 B2
(45) Date of Patent: Aug. 9, 2022

(54) ROOFING UNDERLAY, PARTICULARLY FOR USING AS ROOF CLADDING UNDERLAY AND/OR ROOF LINING MEMBRANE

(71) Applicant: EWALD DÖRKEN AG, Herdecke (DE)

(72) Inventors: Ronald Flaig, Leverkusen (DE); Thomas Bachon, Düsseldorf (DE)

(73) Assignee: EWALD DÖRKEN AG, Herdecke (DE)

( * ) Notice: Subject to any disclaimer, the term of this patent is extended or adjusted under 35 U.S.C. 154(b) by 293 days.

(21) Appl. No.: 16/497,677

(22) PCT Filed: Mar. 16, 2018

(86) PCT No.: PCT/EP2018/056666
§ 371 (c)(1),
(2) Date: Sep. 25, 2019

(87) PCT Pub. No.: WO2018/184815
PCT Pub. Date: Nov. 10, 2018

(65) Prior Publication Data
US 2020/0376796 A1    Dec. 3, 2020

(30) Foreign Application Priority Data

Apr. 3, 2017  (DE) .................. 10 2017 003 213.0
Apr. 6, 2017  (DE) .................. 10 2017 003 364.1

(51) Int. Cl.
*B32B 5/02*    (2006.01)
*B32B 7/05*    (2019.01)
(Continued)

(52) U.S. Cl.
CPC ............... *B32B 5/022* (2013.01); *B32B 7/05* (2019.01); *B32B 7/08* (2013.01); *B32B 27/065* (2013.01);
(Continued)

(58) Field of Classification Search
CPC .... B32B 2419/06; E04D 12/002; E04B 1/625
See application file for complete search history.

(56) References Cited

U.S. PATENT DOCUMENTS

2007/0144110 A1* 6/2007 Aalbers .................. B32B 27/32
                                                       52/782.1
2009/0223155 A1* 9/2009 Perry .................... E04D 12/002
                                                       52/309.1
(Continued)

FOREIGN PATENT DOCUMENTS

DE    29805622 U1    6/1998
DE    19857483 A1 *  6/2000   ............ B32B 7/12
(Continued)

OTHER PUBLICATIONS

International Search Report for International Application No. PCT/EP2018/05666, dated Jul. 2, 2018.
(Continued)

*Primary Examiner* — Alicia J Sawdon
(74) *Attorney, Agent, or Firm* — Jason H. Vick; Sheridan Ross, PC (57) ABSTRACT

The invention relates to a roofing underlay (1), especially one intended for use as roof cladding underlay and/or roof lining membrane, having at least one outer nonwoven layer (2), at least one inner nonwoven layer (3) and at least one microporous membrane layer (4) based on at least one polyolefin plastic, wherein the membrane layer (4) is arranged between the outer nonwoven layer (2) and the inner nonwoven layer. According to the invention, it is provided
(Continued)

that at least one further microporous membrane layer (5) based on a polyolefin plastic is provided between the outer nonwoven layer (2) and the inner nonwoven layer and the further membrane layer (5) is separated from the membrane layer (4) by a separating layer (6), wherein the separating layer (6) is water-permeable and/or embodied as a structure made of fibers, especially nonwoven.

21 Claims, 6 Drawing Sheets (51) Int. Cl.
*B32B 7/08* (2019.01)
*B32B 27/06* (2006.01)
*B32B 27/12* (2006.01)
*B32B 27/32* (2006.01)
*E04D 12/00* (2006.01)

(52) U.S. Cl.
CPC .............. *B32B 27/12* (2013.01); *B32B 27/32* (2013.01); *E04D 12/002* (2013.01); *B32B 2250/05* (2013.01); *B32B 2250/40* (2013.01); *B32B 2262/0284* (2013.01); *B32B 2305/026* (2013.01); *B32B 2307/718* (2013.01); *B32B 2307/724* (2013.01); *B32B 2323/04* (2013.01); *B32B 2323/10* (2013.01); *B32B 2419/06* (2013.01)

(56) References Cited

U.S. PATENT DOCUMENTS

| 2012/0094067 | A1 |   | 4/2012 | Nakae et al. |
| 2015/0298427 | A1 | * | 10/2015 | Kronenberg .......... B32B 27/065 |
|   |   |   |   | 428/319.7 |
| 2017/0129228 | A1 | * | 5/2017 | Middlesworth ......... B32B 27/08 |

FOREIGN PATENT DOCUMENTS

| DE |   | 19904423 | A1 | * | 8/2000 | ............. D04H 13/00 |
| DE |   | 19904423 | A1 |   | 8/2000 |   |
| DE |   | 102015000092 | A1 |   | 4/2016 |   |
| WO | WO- | 2006008351 | A1 | * | 1/2006 | ............. B32B 3/266 |

OTHER PUBLICATIONS

Written Opinion for International Application No. PCT/EP2018/05666, dated Jul. 2, 2018.
International Preliminary Report on Patentability for International Application No. PCT/EP2018/056666, dated Oct. 17, 2019.

* cited by examiner

ROOFING UNDERLAY, PARTICULARLY FOR USING AS ROOF CLADDING UNDERLAY AND/OR ROOF LINING MEMBRANE

CROSS REFERENCE TO RELATED APPLICATIONS

This application is a national stage application under 35 U.S.C. 371 of PCT Application No. PCT/EP2018/056666 having an international filing date of 16 Mar. 2018, which designated the United States, which PCT application claimed the benefit of German Application No. 10 2017 003 213.0, filed 3 Apr. 2017, and German Application No. 10 2017 003 364.1, filed 6 Apr. 2017, each of which are incorporated herein by reference in their entirety.

SUMMARY

The present invention relates to a roofing underlay, especially one intended for use as roofing underlay, having at least one outer nonwoven layer, at least one inner nonwoven layer and at least one microporous membrane layer based on at least one polyolefin plastic, wherein the membrane layer is arranged between the outer nonwoven layer and the inner nonwoven layer. Furthermore, the present invention relates to a method for producing said roofing underlay.

The concept and/or denotation "outer" indicates here that the roofing underlay is facing toward the weathering side and in particular away from the roofing structure. Consequently, the concept "inner" means that the inner nonwoven layer is facing toward the roofing structure and away from the weathering side.

The microporous membrane layer of the above-mentioned roofing underlay is based on a polyolefin plastic. Polyolefins are polymers made by chain polymerization from alkenes such as ethylene, polypropylene, 1-butene or isobutene. Polyolefins are saturated hydro-carbons, constituting the largest group of plastics in terms of quantity. Furthermore, they are assigned to the semi-crystalline thermoplastics. Thermoplastics are especially easy to work on account of a possible reversible deformation. In addition, polyolefins are distinguished by good chemical resistance and especially good electrical insulating properties.

Moreover, "microporous" means, in connection with the membrane layer, that the membrane layer has microscopically tiny holes and/or breaches, which are large enough to let water vapor molecules diffuse through them. At the same time, these holes and/or breaches are small enough that larger water molecules, especially the water molecules of rain drops, cannot get through the membrane layer. In this case, the microporosity indicates that the roofing underlay is both water-tight and water vapor-permeable. The microporous structure of the membrane layer is created by a special pretreatment. Thus, fillers are added to the plastic material being processed, preferably calcium carbonate and especially chalk particles. This material is then extruded in order to produce the membrane layer and, in a further step, is stretched monaxially or biaxially at high temperatures and then cooled down under tension. Thanks to the stretching, the extruded membrane layer rips open especially in the area of the fillers, yielding the microporosity.

The primary task of such a roofing underlay, also known as a roof lining membrane and/or roof cladding underlay, is to provide rain protection for a roof beneath the hard roofing. Underlays of the mentioned kind are used in construction and have in particular the task of protecting roofing structures against rain, moisture, driven snow and dust. The roofing underlays are used preferably on pitched roofs, such as hipped roofs or dome hipped roofs.

At the same time, besides the outer protection against dampness, it is necessary for water vapor which may result from excess moisture from the building humidity and/or from occupied portions of the roof to escape to the outside through the roofing underlay. This water vapor is given off to the surroundings, so that it is necessary for roofing underlays to have an adequate permeability to water vapor. This permeability is provided by a selective permeability, so that a roofing underlay is water vapor-permeable at the same time as assuring a water-tight function.

Selective permeability means in the present case that diffusion-openness is ensured. Consequently, the roofing underlay is resistant to water and/or tight up to a given water column. However, water vapor can get to the outside from inside the building, especially from the roof area, on account of the diffusion-openness. There is preferably no impairment of the thermal insulation or other objects located inside the building due to excessively high humidity.

If the roofing underlay had no or too little water vapor permeability, excess moisture present in the roof area might condense on the roofing underlay, so that in particular the thermal insulation might become saturated, thus worsening its thermal insulating function.

Such roofing underlays are generally used for a lengthy period of time, which may stretch over many years or even decades. Consequently, especially high demands are placed on the resistance to aging, since the roofing underlays are exposed to environmental influences such as temperature fluctuations, UV radiation, dampness and dust. These environmental influences have an especially accelerating effect on the natural aging process of the membrane layer and result in a loss of mechanical properties, especially breaking strength and elongation at break.

With outdoor exposure, the roofing underlays are subjected to damp weather, which may in particular hasten the aging process. This phase of outdoor exposure begins when the roofing underlays have already been laid, but the roof is not yet completely or is only partly finished. Primarily during this time the roofing underlay is exposed to great stress on account of the incident UV intensity.

In order to prevent the aging process, it is known in the prior art how to apply an acrylate coating directly on an outer nonwoven material. This acrylate coating in particular protects the roofing underlay against UV radiation. However, such roofing underlays have a relatively low water-tightness.

Moreover, roofing underlays are known with an extrusion coating, wherein for example a water vapor-permeable TPU layer is applied to a nonwoven. A monolithic film is formed, providing water-tightness with a sufficiently high water column. However, such roofing underlays display a deficient resistance to UV radiation and hydrolysis. The same is true when the functional layer is formed as a microporous film of polypropylene, for example.

As a result, the known roofing underlays have either good durability or good water-tightness.

The problem which the present invention proposes to solve is to deal with the mentioned problem by providing a roofing underlay having both a good resistance to the penetration of water and a good water vapor permeability with improved durability at the same time.

According to the invention, the aforementioned problem is solved at least substantially for a roofing underlay of the aforementioned kind in that at least one further microporous membrane layer based on a polyolefin plastic is provided between the outer nonwoven layer and the inner nonwoven layer, and the further membrane layer is separated from the membrane layer by a separating layer, wherein the separating layer is water-permeable and/or embodied as a structure made of fibers, especially nonwoven.

In connection with the creation of the present invention, it was discovered that the aging process in the roofing underlay starts during the weathering of the outer membrane surface facing toward the weather. Furthermore, it has been discovered that, if only one membrane layer is used having a layer thickness corresponding to the layer thickness of the membrane layers provided in the roofing underlay according to the invention, this thicker membrane layer has a lesser resistance to the aging process than is the case when it is divided into at least two membrane layers. In addition, it has been discovered that it is not even necessary for the two membrane layers divided according to the invention to have the same layer thickness in total as a single membrane layer with increased thickness. The division as such leads to an improved resistance to the aging process, even for a reduced layer thickness. Moreover, the two membrane layers separated from each other according to the invention ensure a very good water-tightness and also provide a good water vapor permeability. Moreover, it has also been discovered according to the invention that the membrane functions of water-tightness can be achieved over a much longer period of time than when using a single homogeneous membrane layer of identical layer thickness.

In order to achieve the effect according to the invention, it is necessary to separate and/or decouple the two membranes physically from each other. According to the invention, this is accomplished in that there is a separating layer present between the membrane layers. Furthermore, it has been found in connection with the creation of the invention that the outer membrane layer facing toward the weather is more intensely subject to aging phenomena, which affects the water-tightness of this layer. Despite this impairment, the outer membrane layer protects the further membrane layer underneath it, which faces toward the inner nonwoven layer, against environmental aging influences. The membrane layer facing toward the outer nonwoven layer and the weather represents a so-called "sacrificial layer". The membrane layer facing toward the inner nonwoven layer provides the critical water-tight and water vapor-permeable function for the roofing underlay for a very long period of use, preferably for more than 15 years.

The separating layer is preferably water-permeable, with "water-permeable" understood in the sense of the present invention as a penetrability by and/or permeability to water in the liquid state of aggregation. In particular, the separating layer is also permeable to and/or penetrable by water in the gaseous state of aggregation, that is, it is ultimately water vapor-permeable. Furthermore, the separating layer may also be permeable to and/or penetrable by air.

Furthermore, the separating layer may be formed additionally or alternatively as a structure made of fibers, preferably nonwoven. The fibers may have a limited length and/or be formed as continuous fibers and/or filaments and/or as cut yarn of any kind and any origin, which are combined together and/or interconnected to form a nonwoven (fiber layer and/or fiber web).

Preferably, the separating layer is not embodied as a membrane layer and/or is membrane layer-free, with membrane layer understood in the sense of the present invention as both a water vapor-permeable and a water-tight layer. In particular, the separating layer is not water-tight.

The separating layer may also be a foam, especially a perforated and/or open-pore foam and/or a foam layer and/or a scrim and/or an adhesive, especially one applied in a filamentous structure, in a fibrous structure and/or in a grid pattern. As the scrim, one may use monaxial, unidirectional, biaxial and/or multiaxial scrims. Furthermore, a textile may also be used as the separating layer.

If the separating layer is formed as an adhesive, especially one applied in a filamentous structure, in a fibrous structure and/or a grid pattern, in addition to the decoupling of the membrane layer and the further membrane layer it also serves to connect the membrane layers, especially in integral manner, and ultimately to bond the membrane layers.

Moreover, long-term experiments with the roofing underlay according to the invention have established that, even when the natural aging process has proceeded for the top membrane layer, this shows no loss of its mechanical properties, especially of breaking force and elongation at break.

In addition, the production of a roofing underlay according to the invention is much more economical than the production of a roofing underlay having a monolithic membrane layer.

Moreover, it was observed in conducted experiments that the resistance to the aging process of the roofing underlay according to the invention can be improved by more than 100% compared to the roofing underlays known in the prior art. In particular, the resistance to UV light and/or weather influences was tested. At the same time, the good water-tightness was preserved, or even boosted by up to 100%.

Furthermore, it was observed during experiments that the use of two membrane layers decoupled from each other by a separating layer has particularly excellent resistance to the aging process.

In connection with the present invention, a plurality of further membrane layers may in principle be provided. As a result, more than two membrane layers may be provided. If more than two membrane layers are provided, a further separating layer is located between any two adjacent membrane layers. Also when using a plurality of membrane layers, preferably between three and five membrane layers, it was ascertained that a roofing underlay according to the invention comprising a plurality of membrane layers shows improved durability as compared to a roofing underlay comprising a single membrane layer having the sum of the thicknesses of the individual membrane layers as the thickness of the single membrane layer.

The further separating layer is likewise water-permeable and/or formed as a structure made of fibers, especially nonwoven. Preferably, the further separating layer has at least substantially the same properties as the separating layer. In particular, the further separating layer is formed at least substantially identical to the separating layer.

In another advantageous embodiment of the idea of the invention, the use of polypropylene (PP) and/or polyethylene (PE) is provided as the basis for the material of the membrane layer. Polypropylene (PP) and polyethylene (PE) are ranked among the polyolefins.

Moreover, it has been shown in experiments carried out that in an especially preferred variant embodiment of the present invention the membrane layer has a thickness in the range of 20 to 200 µm, preferably between 30 and 120 µm, further preferably between 35 and 100 µm.

This membrane layer thickness refers to the thickness of a single membrane layer, it being understood that multiple membrane layers, at least two of them, can be used in the construction of the roofing underlay according to the invention. The membrane layers in another advantageous variant embodiment have a grammage between 15 and 150 g/m$^2$, preferably between 20 and 100 g/m$^2$, further preferably between 20 and 50 g/m$^2$.

Furthermore, it became clear during a series of experiments that it is especially advantageous for the membrane layers to have different configurations, wherein in particular they will have different thicknesses and/or different materials. Finally, it is understood that it may also be provided according to the invention that the membrane layers may have the same construction and/or the same thickness.

It was found to be an especially advantageous variant embodiment when the thickness of the membrane layer facing toward the outer nonwoven layer is greater, preferably by between 50% and 200%, further preferably by up to 70%, further preferably by up to 85% and especially at least substantially up to 100%, than the thickness of the membrane layer facing toward the inner nonwoven layer. In the present case, the percentages indicate that, for a 100% larger membrane layer, this will have twice and/or double the thickness of the membrane layer facing toward the inner nonwoven layer. The doubly thick design of the membrane layer facing toward the outer nonwoven layer results in a significant improvement in the resistance to the aging process, while the different configuration of the membrane layers according to the invention produces an improvement of up to 10% as compared to the design with two membrane layers of the same thickness.

Furthermore, it was also determined that it is likewise especially advantageous if the thickness of the membrane layer facing toward the inner nonwoven layer is greater, preferably by between 50% and 200%, further preferably by up to 70%, further preferably by up to 85% and especially at least substantially up to 100%, than the thickness of the membrane layer facing toward the outer nonwoven layer. In the doubly large and/or thick design (100% increase) of the membrane layer facing toward the inner nonwoven layer as compared to the membrane layer facing toward the outer nonwoven layer, an increased resistance to UV radiation of more than 70% was achieved, as compared to a single membrane layer having the thickness of the two single membrane layers. Ultimately, the choice of whether the outer or the inner membrane layer is thicker than the other membrane layer or whether the two membrane layers are of the same thickness will depend on the particular conditions of use. The same holds for the case when the two membrane layers consist of different materials rather than the same one.

Regardless of the choice and configuration of the material and/or the thickness of the membrane layers used, it must be considered that an increasing layer thickness of the respective membrane layer is accompanied by increasing resistance to the aging process. However, it must also be considered that, with increasing layer thickness, the water vapor permeability decreases in particular. Therefore, for each individual instance one must find the optimum between very high water vapor permeability and simultaneously excellent resistance to the aging process.

The outer nonwoven layer serves as a carrier and protection layer for the following membrane layer. It may also be a first barrier for the protection against UV rays.

In one advantageous embodiment of the idea of the invention, it is provided that the outer nonwoven layer has a grammage between 20 and 200 g/m$^2$, preferably between 30 and 140 g/m$^2$, further preferably between 40 and 100 g/m$^2$, further preferably between 50 and 80 g/m$^2$ and in particular at least substantially less than or equal to 70 g/m$^2$. It has been found in the experiments that were conducted that the optimum between the properties being realized is located at 70 g/m$^2$.

In another especially advantageous embodiment it is provided that the inner nonwoven layer has a grammage between 1 and 150 g/m$^2$, preferably between 5 and 100 g/m$^2$, further preferably between 10 and 50 g/m$^2$ and especially at least substantially less than or equal to 20 g/m$^2$. Consequently, it is especially advantageous to use an outer layer having a grammage of preferably 70 g/m$^2$ with an inner nonwoven layer having in particular a lower grammage of preferably 20 g/m$^2$. The reduced grammage of the inner nonwoven layer, as has been ascertained according to the invention, results from the fact that the interior arrangement of the inner nonwoven layer requires a lesser protective function than the outer nonwoven layer. The configuration according to the invention ultimately ensures less material consumption and thus also results in a roofing underlay which is lighter in terms of grammage and/or thinner.

Furthermore, in another especially preferred embodiment of the roofing underlay it is provided that the separating layer is likewise embodied as a nonwoven layer. Preferably, the separating layer has a grammage between 1 and 150 g/m$^2$, preferably between 5 and 100 g/m$^2$, further preferably between 10 and 50 g/m$^2$ and especially at least substantially less than or equal to 20 g/m$^2$.

Moreover, in another preferred embodiment it may be provided that the separating layer is embodied as a foam, especially a perforated and/or open-pore foam and/or foam layer, as a scrim, as a textile and/or especially as an adhesive applied in a filamentous structure, in a fibrous structure and/or in a grid pattern. Preferably the separating layer has a grammage between 1 and 150 g/m$^2$, preferably between 5 and 100 g/m$^2$, further preferably between 10 and 50 g/m$^2$ and especially at least substantially less than or equal to 20 g/m$^2$.

Moreover, in one especially preferred embodiment of the roofing underlay it is provided that the roofing underlay with its overall construction, i.e., the outer and inner nonwoven layers, the two membranes and the separating layer, is overall selectively permeable. The selective permeability of the roofing underlay has the effect that it is water-tight in particular while at the same time assuring water vapor permeability. The water-tightness is especially shown in being present for a water column between 0.8 and 40 m, preferably between 0.9 and 30 m, further preferably between 1 and 20 m.

For the assessment of the water-tightness of roofing underlays, one should use DIN 1928 and DIN 20811. These DIN standards show the testing conditions and/or methods for determining water-tightness. Water-tightness is critical to the use of the roofing underlay, since it is subjected to dampness and possibly driving rain, especially on roofs exposed to open weather. All of the above-mentioned water columns correspond to a high resistance to the passage of water per DIN 20811.

Furthermore, in one especially preferred embodiment the roofing underlay is designed such that it provides a water vapor diffusion-equivalent air layer thickness ($s_d$ value) between 0.01 and 1 m, preferably between 0.02 and 0.5 m, further preferably between 0.03 and 0.3 m and especially at least substantially less than or equal to 5 cm. The diffusion-openness of the roofing underlay makes it possible for dampness to escape from the interior of the building through the roofing underlay according to the invention. The $s_d$ value characterizes the water vapor diffusion resistance. Diffusion-openness defines the opposite of a vapor barrier, where the vapor barrier ensures a good dampness protection for a base surface on which it is laid. The determination of the $s_d$ value is regulated via DIN 4108 (Thermal protection high-rise construction) in the third part (Climate-related moisture protection; requirement, calculation method, and instructions for design and execution). As the limit value for diffusion-openness, DIN 4108-3 defines a $s_d$ value of less than 0.5 m. Accordingly, the roofing underlay should preferably be designed to ensure an especially high diffusion-openness.

Another advantageous aspect of the present invention is that the nonwoven layer and/or the separating layer and/or their fibers comprise a plastic material, preferably a thermoplastic material, especially polyester (PES) and/or polyethylene (PE) and/or polypropylene (PP) and/or polyethylene terephthalate (PET), in particular consist of such a material. Thermoplastic materials make it possible to ensure in particular the least possible layer thickness while at the same time protecting the membrane layers. The design of the separating layer as a nonwoven layer not only affords a protection for the membrane layer situated underneath in relation to the weathering side, it also decouples the membrane layers from each other, so that the embodiment of the nonwoven layer comprising a thermoplastic material realizes especially good decoupling properties. These good decoupling properties make possible the use of the membrane layer facing toward the outer nonwoven layer as a so-called "sacrificial layer" according to the invention.

Moreover, in an especially preferred embodiment of the roofing underlay it is provided that the membrane layer is firmly joined to the inner and/or outer nonwoven layer. This joining is preferably performed by ultrasound welding, especially with punctual spot welds, and/or by a bonding connection and/or by gluing, especially by partial punctual bonding, and/or by hot calendering. However, for connecting of all layers to each other it is not enough to join only the membrane layer to the outer and/or inner nonwoven layer, because at least two membrane layers are provided in the roofing underlay according to the invention, so that the membrane layers which are separated from each other by means of a separating layer are also joined. Preferably, each membrane layer is connected to the immediately adjacent membrane layer via the separating layer, this connection being realized by means of ultrasound welding, especially with punctual spot welds, and/or by gluing, especially by punctual partial bonding, and/or by hot calendering. The firm connecting of the membrane layers to each other means in particular that the roofing underlay as a whole has a high breaking strength. Furthermore, a connecting of the individual layers to each other preferably ensures that the layers cannot shift relative to each other.

In particular, the connection enables the roofing underlay to be easily rolled up and thus be made ready for transport and/or shipment.

If the separating layer is configured as an adhesive and/or as an adhesive layer, preferably applied in a filamentous structure, in a fibrous structure, and/or a grid pattern, then the separating layer itself can contribute to the firm connection of the membrane layers to the separating layer and ultimately also to the firm connection of the membrane layers to each other, and/or it can ensure this connection.

Installation on a roof surface requires not only a firm joining of the individual layers to each other, however, but also in particular a connection, preferably a water-tight connection, of individual roofing underlays to each other. For this connection, it is preferably provided that an adhesive area is arranged in and/or on the top and/or bottom side of at least one edge of the roofing underlay. It is understood that at least one adhesive area is present on one lengthwise edge. There are very different possibilities for the arrangement of an adhesive area. Thus, it is basically possible to provide an adhesive area only at one lengthwise edge. In an alternative embodiment, an adhesive area may be provided on the top side and bottom side at one lengthwise edge. In another embodiment, an adhesive area is provided at opposite lengthwise edges on the same side, while in another embodiment adhesive areas are provided at opposite lengthwise edges on opposite sides. It is also basically possible to provide adhesive areas at the top side and bottom side of both lengthwise edges. The adhesive areas can ultimately increase the rain protection and achieve wind-proofing of the connection of two adjacent roofing underlays in the edge region.

The adhesive areas are embodied preferably as strips, possibly with interrupted strips. They are arranged at the lengthwise edge and may furthermore also be applied merely in punctually. The adhesive areas are preferably covered with a liner, preferably siliconized paper and/or siliconized foil.

Furthermore, the present invention relates to a method for production of a roofing underlay having at least one outer nonwoven layer, at least one inner nonwoven layer and at least one microporous membrane layer based on polyolefin plastics. The membrane layer is arranged between the outer nonwoven layer and the inner nonwoven layer.

According to the invention, it is provided in the aforementioned method that at least one further microporous membrane layer based on a polyolefin plastic is provided between the outer nonwoven layer and the inner nonwoven layer, and the further membrane layer is separated from the membrane layer by a separating layer, wherein the separating layer is water-permeable and/or embodied as a structure made of fibers, especially nonwoven.

One preferred embodiment of the method provides that immediately adjacent membrane layers are joined together across separating layers, wherein various methods can be used for the joining. Preferably, ultrasound welding is used, especially via punctual partial spot welds applied to parts of the surface. Ultrasound welding is a method for the joining of thermoplastic materials and metallic materials. The welding is accomplished by a high-frequency mechanical oscillation, especially in the range of 20-30 kHz. During the welding, a connection is realized between the membrane layers being welded by heating through molecular and boundary layer friction. Ultrasound welding is assigned to the frictional welding group. Besides punctual welds, welded seams are also possible. An integral connection of the membrane layer to the separating layer is ensured in particular by bonding. The adhesive is preferably applied punctually partially. Another preferred method of joining the membrane layers to the separating layer is provided by hot calendering. The calendering and/or hot calendering is carried out by means of a calendar a system of multiple heated and polished rolls coordinated with each other.

If the separating layer is applied to the membrane layer and/or the further membrane layer as an adhesive, especially in a filamentous structure, in a fibrous structure and/or a grid pattern, then the separating layer itself can be used for the bonding of the separating layer to the membrane layers, and will then constitute the glue and ensure a preferably firm and/or integral connection of the separating layer to the membrane layers.

In another especially preferred embodiment of the idea of the invention, it is provided that first of all an at least three-layer construction having an outer nonwoven layer, a membrane layer and a separating layer is produced in particular by calendering and/or ultrasound welding. In addition, it is preferably provided that an at least two-layer construction having an inner nonwoven layer and a membrane layer is produced in particular by means of ultrasound welding. Consequently, an at least two-layer construction and an at least three-layer construction is present, each having a nonwoven structure on the outside. These two layered constructions are then joined together, in particular by a punctual partial spot bonding and/or full-surface bonding, wherein the membrane layer of the at least two-layer construction is facing toward the separating layer of the at least three-layer construction. It is understood that a plurality of membrane layers with respective corresponding separating layers can be provided in the at least two-layer and/or three-layer construction. Especially suitable as the bonding agent here is a hot melt adhesive or a dispersion adhesive.

Moreover, the ultrasound welding is advantageously performed using sonotrodes, producing in particular punctual welds and/or weld spots. Sonotrodes are tools which are placed in resonance oscillations by introducing high-frequency mechanical vibrations. In ultrasound welding they represent the possibility of producing a durable connection between individual layers and/or components. The joining and/or contact zones are durably connected by virtue of various processes. Various geometries may be used for the sonotrode. In particular, the sonotrode has a direct contact with the membrane layer and/or nonwoven layer being welded together.

Thus, the invention relates to a roofing underlay which is used preferably as a roof lining membrane and/or roof cladding underlay. The roofing underlay comprises an at least five-layer construction. The roofing underlay according to the invention has an especially good durability, while at the same time also preserving its selective water-tight and water vapor-permeable permeability for a long period of use.

Moreover, it is understood that the mentioned intervals and range limits are considered to contain any intermediate intervals and individual values, which are regarded as being disclosed in the invention even if these intermediate intervals and individual values are not specifically indicated.

BRIEF DESCRIPTION OF THE DRAWINGS

Further features, benefits and application possibilities of the present invention will emerge from the description of exemplary embodiments with the aid of the drawing and from the drawing itself. In themselves or in any given combination, all the described and/or depicted features form the subject matter of the present invention regardless of their statement in the claims or their reference to other claims.

DETAILED DESCRIPTION

Figure 1:
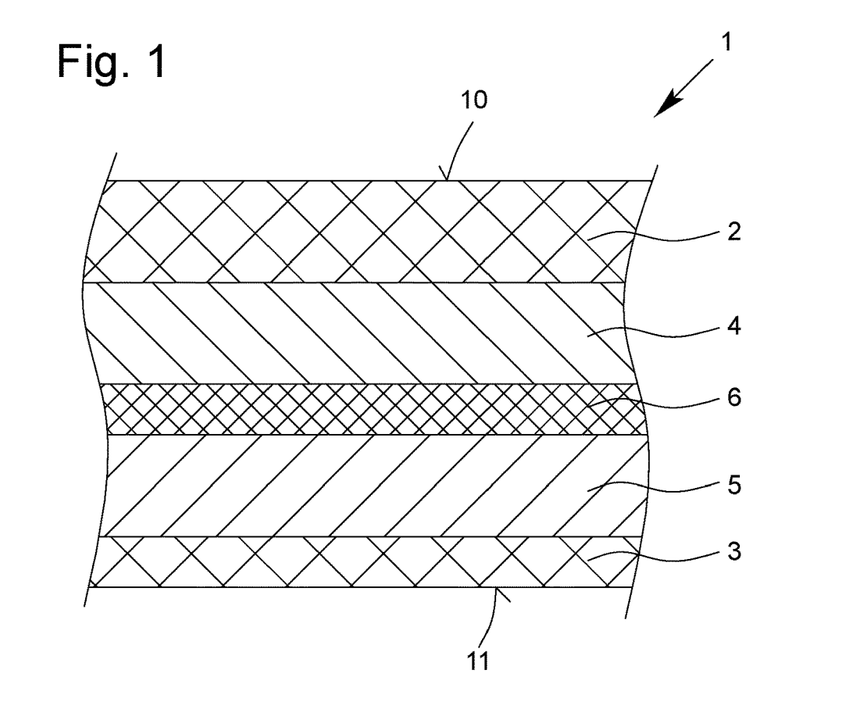
FIG. 1 shows a schematic cross sectional view of a roofing underlay according to the invention.

The roofing underlay 1 shown in FIG. 1 comprises an outer nonwoven layer 2 and an inner nonwoven layer 3. Between the outer nonwoven layer 2 and the inner nonwoven layer 3 is arranged a microporous membrane layer 4 based on a polyolefin plastic. Besides the first membrane layer 4, a further membrane layer 5 is arranged between the outer nonwoven layer 2 and the inner nonwoven layer 3. The two membrane layers 4, 5 are separated from each other by a separating layer 6.

In the embodiment shown, the separating layer 6 is formed water-permeable that means not water-tight. Furthermore, in the embodiments shown it is provided that the separating layer 6 is embodied as a structure made of fibers, wherein a nonwoven is provided as the structure. In further embodiments (not shown), a water-permeable and/or membrane layer-free layer or a structure made of fibers is provided as the separating layer 6. Moreover, the separating layer 6 in the embodiments shown is air- and water vapor-permeable.

It is not shown that the separating layer 6 is embodied as an especially perforated and/or open-pore foam and/or foam layer, and/or as a scrim and/or as a textile and/or as an adhesive which is applied in particular in a filamentous structure, in a fibrous structure and/or in a grid pattern.

It should be pointed out that both the outer nonwoven layer 2 and the inner nonwoven layer 3 need not be embodied as a single layer. The outer nonwoven layer 2 and/or the inner nonwoven layer 3 may each basically also be embodied as multiple layers. But in the following, a single-layer embodiment of the nonwoven layers 2, 3 shall be assumed.

The outer nonwoven layer 2 comprises the outside 10 of the roofing underlay 1. Accordingly, the inner nonwoven layer 3 comprises on its outside the inside 11 of the roofing underlay 1. The outside 10 of the roofing underlay 1 is facing toward the weathering side and the inside 11 of the roofing underlay 1 is facing toward the base surface and/or the roof substructure. The microporous membrane layer 4, 5 has microscopically tiny holes/openings, which are configured such that water vapor molecules can diffuse through them, yet which are small enough that water in the liquid state of aggregation cannot get through them. A microporous membrane layer 4, 5 is accordingly diffusion-open, water-tight and water vapor-permeable. The membrane layer 4 facing toward the outer nonwoven layer 2 protects the inner membrane layer 5 against damaging environmental influences, such as temperature influences, UV radiation, dampness and/or dust. The damaging environmental influences have an accelerating effect on the aging process of the membrane layer 4, 5.

Figure 4:
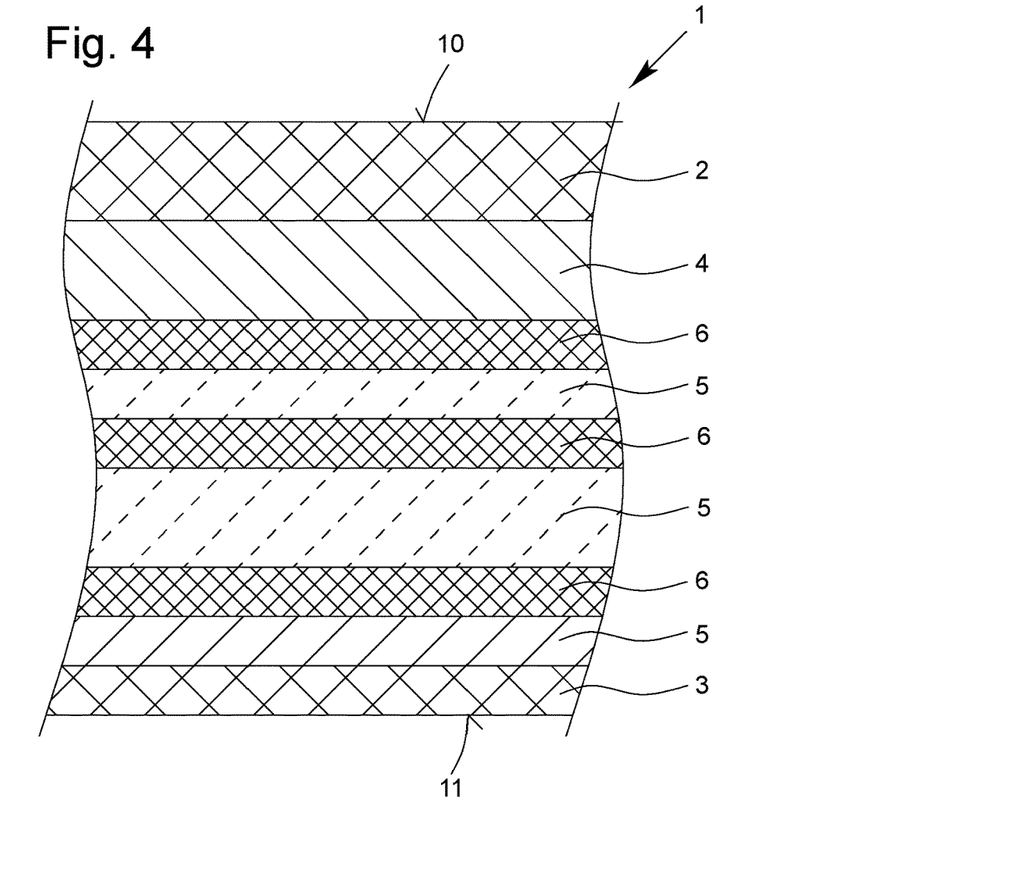
FIG. 4 shows a schematic cross sectional view of another embodiment of a roofing underlay according to the invention.

In a further exemplary embodiment, FIG. 4 shows that a plurality of membrane layers 5 is present between the outer nonwoven layer 2 and the inner nonwoven layer 3. The membrane layers 5 are each separated and/or decoupled from each other by means of separating layers 6.

Moreover, in the exemplary embodiment shown it is provided that the microporous membrane layer 4 comprises polypropylene (PP) as the polyolefin plastic. In a further exemplary embodiment (not shown), it is provided that polyethylene (PE) is used as the material for the microporous membrane layer 4.

According to the exemplary embodiment of FIG. 1, it is provided that the membrane layer 4, 5 has a thickness of 100 μm. In further variant embodiments (not shown), the membrane layer 4, 5 has a thickness in the range of 20 to 200 μm, preferably between 30 and 120 μm, further preferably between 35 and 100 μm. The grammage of the membrane layer 4, 5 is between 15 and 150 g/m², preferably between 20 and 100 g/m², further preferably between 20 and 50 g/m².

Figure 2:
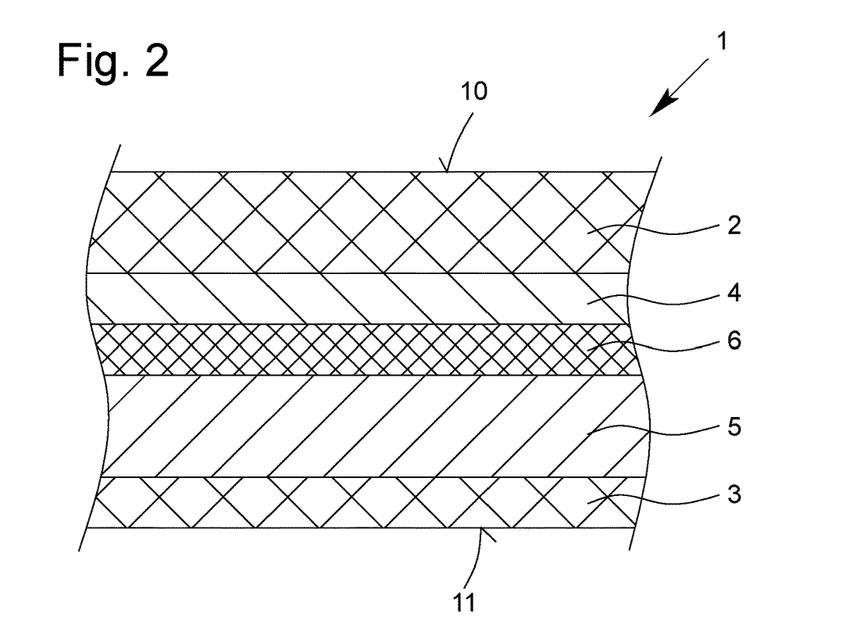
FIG. 2 shows a schematic cross sectional view of another embodiment of a roofing underlay according to the invention.

Moreover, FIG. 2 shows that the thickness of membrane layer 5, which is facing toward the inner nonwoven layer 3, is twice as great as the thickness of the membrane layer 4 facing toward the outer nonwoven layer 2. In further variant embodiments (not shown), the thickness of the membrane layer 5 facing toward the inner nonwoven layer 3 is between 50% and 200%, preferably up to 70%, further preferably up to 85% and especially at least substantially up to 100% greater than the thickness of the membrane layer 4 facing toward the outer nonwoven layer 2. Finally, it is understood that in further embodiments (not shown), it is provided that the thickness of the membrane layer 5 facing toward the inner nonwoven layer 3 is greater than that of the membrane layer 4 facing toward the outer nonwoven layer 2.

Figure 3:
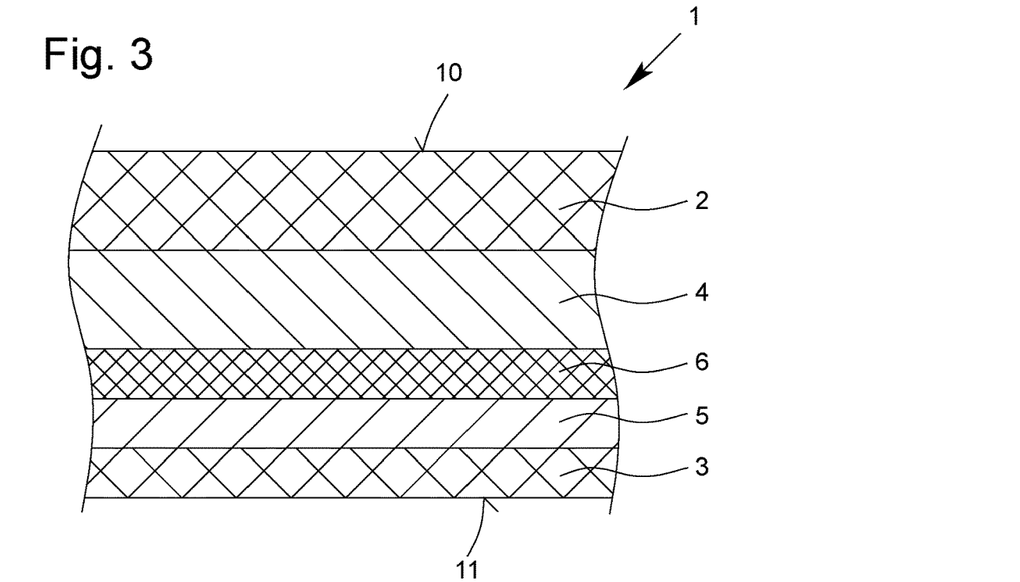
FIG. 3 shows a schematic cross sectional view of another embodiment of a roofing underlay according to the invention.

Moreover, FIG. 3 shows that the thickness of the membrane layer 4 facing toward the outer nonwoven layer 2 is greater than the thickness of the membrane layer 5 facing toward the inner nonwoven layer 3. Moreover, FIG. 3 shows that the inner membrane layer 5 is half as thick as the outer membrane layer 8. In further embodiments (not shown), it is provided that the thickness of the membrane layer 4 facing toward the outer nonwoven layer 2 is greater, preferably by between 50% and 200%, further preferably by up to 70%, further preferably by up to 85% and especially at least substantially by up to 100%, than the thickness of the membrane layer 5 facing toward the inner nonwoven layer 3.

Moreover, in the exemplary embodiments per FIGS. 1 to 4 it is provided that the grammages of the outer nonwoven layer 2 and the inner nonwoven layer 3 are different. In the exemplary embodiment shown in FIGS. 1 to 4, it is provided that the outer nonwoven layer 2 has a grammage of around 70 g/m². In further embodiments (not shown here), it is provided that the outer nonwoven layer 2 has a grammage between 20 and 200 g/m², preferably between 30 and 140 g/m², further preferably between 40 and 100 g/m², further preferably between 50 and 80 g/m². In the exemplary embodiments shown in FIGS. 1 to 4, the inner nonwoven layer 3 has a lower grammage than the outer nonwoven layer 2. The grammage of the inner nonwoven layer 3 in the exemplary embodiment shown is 20 g/m². In further embodiments, it is provided that the inner nonwoven layer 3 has a grammage between 1 and 150 g/m², preferably between 5 and 100 g/m², further preferably between 10 and 50 g/m² and especially at least substantially less than or equal to 20 g/m².

In the exemplary embodiments shown, the separating layer 6 has the same thickness as the inner nonwoven layer 3. Furthermore, the separating layer 6 has a similar grammage to the inner nonwoven layer 3. The grammage of the separating layer 6 in the exemplary embodiment shown is 20 g/m². In further variant embodiments of the roofing underlay 1, it is provided that the separating layer 6 has a grammage between 1 and 150 g/m², preferably between 5 and 100 g/m², further preferably between 10 and 50 g/m² and especially at least substantially less than or equal to 20 g/m². In the embodiments shown, the separating layer 6 is embodied as a nonwoven layer.

Moreover, the roofing underlay 1 is selectively permeable, so that in the exemplary embodiment shown it is both water-tight and water vapor-permeable. The roofing underlay 1 has water-tightness for a water column between 0.8 and 40 m. In the exemplary embodiment shown, it has water-tightness for a water column of 15 m. In further embodiments, it is preferably provided that the roofing underlay 1 has water-tightness withstanding a water column between 0.9 and 30 m, further preferably between 1 and 20 m. However, the roofing underlay 1 in the embodiments shown has not only water-tightness but also water vapor permeability, which is characterized by the water vapor diffusion-equivalent air layer thickness. In the exemplary embodiment shown, the water vapor diffusion-equivalent air layer thickness ($s_d$ value) is around 5 cm. In further embodiments, it may be provided that the $s_d$ value varies between 0.01 and 1 m, preferably between 0.02 and 0.5 m, further preferably between 0.03 and 0.3 m.

In the embodiment shown, both the nonwoven layer 2, 3 and the separating layer 6 comprise a thermoplastic material. Polyester (PS) is provided as the thermoplastic material. In further embodiments, the use of polyethylene (PE), polypropylene (PP) and/or polyethylene terephthalate (PET) is also provided. Finally, it is understood that the nonwoven layer 2, 3 and/or the separating layer 6 may also consist of the thermoplastic material.

It is not represented that the membrane layers 4, 5 can be joined to the inner nonwoven layer 3 and/or to the outer nonwoven layer 2 by ultrasound welding. In the ultrasound welding, the use of punctual spot welds is preferred. Besides ultrasound welding, gluing is also possible as a method for the connection, especially a punctual partial spot bonding, and/or hot calendering.

It is further not shown that the immediately adjacent membrane layers 4, 5 are joined together across separating layers 6 by means of ultrasound welding, especially with punctual spot welds. Besides ultrasound welding, it is provided that bonding and/or hot calendering can be used as the connection method, similar to the connecting of the membrane layers 4, 5 to the nonwoven layer 2, 3. For the bonding, a punctual partial spot bonding is employed.

In particular, for the bonding it is possible to use the separating layer 6, formed in particular as an adhesive applied in a filamentous structure, in a fibrous structure, and/or in a grad pattern, as the bonding layer itself.

Figure 5:
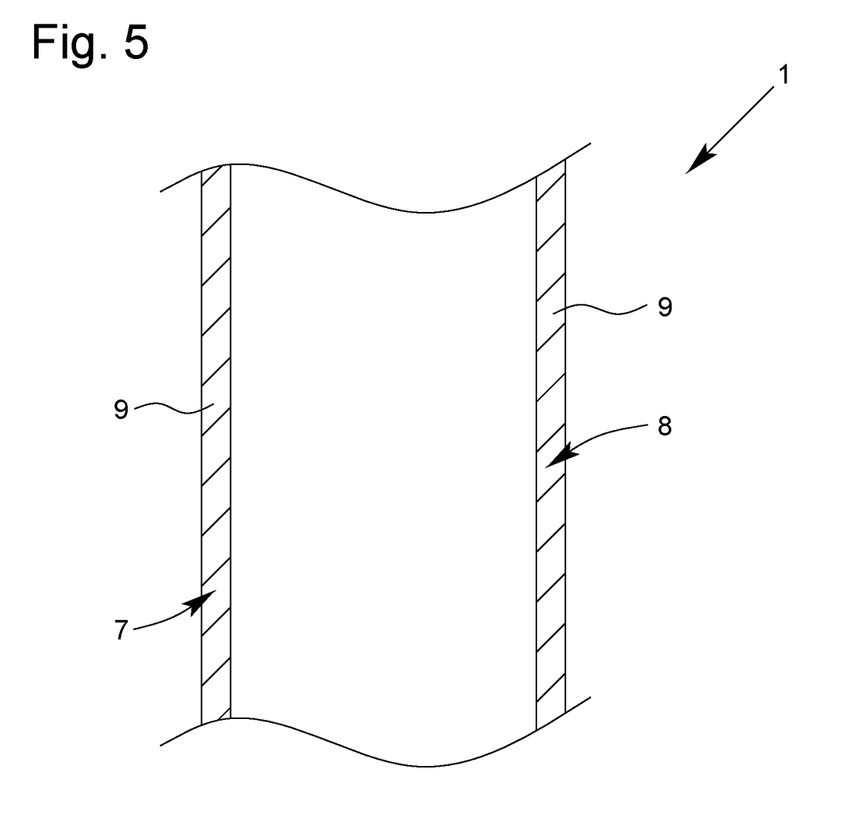
FIG. 5 shows a schematic top view of a roofing underlay according to the invention.

It can be seen in FIG. 5 that the roofing underlay 1 has an adhesive area 9 on each of its lengthwise edges 7, 8. The two adhesive areas are situated on the same side of the roofing underlay 1. This adhesive area 9 serves for the subsequent joining together of the roofing underlays 1 when the roofing underlay 1 is used as a roof lining membrane and/or roof cladding underlay on a roofing structure. The adhesive area 9 may be provided both on the outside 10 of the roofing underlay 1 and on the inside 11 of the roofing underlay 1. Preferably, in an exemplary embodiment (not shown) when using the roofing underlay 1 as a roof lining membrane and/or roof cladding underlay, it is provided that the individual roofing underlays 1 are connected by a "glue-in glue" connection. In this connection, only the adhesive areas 9 are used for the water-tight connection of the roofing underlays 1.

It is not shown that the adhesive area 9 can be covered preferably with a liner, such as siliconized paper. The adhesive area 9 can provide, in addition to a full-surface application as shown in FIG. 5, also a partial or spot application at the lengthwise edge on the roofing underlay 1 and/or on the outside 10 and/or on the inside 11 of the roofing underlay 1. In the exemplary embodiment shown, the width of the adhesive area 9 is around 5 cm. In further embodiments (not shown), it is provided in particular that the width of the adhesive area 9 varies between 3 and 10 cm.

Figure 6:
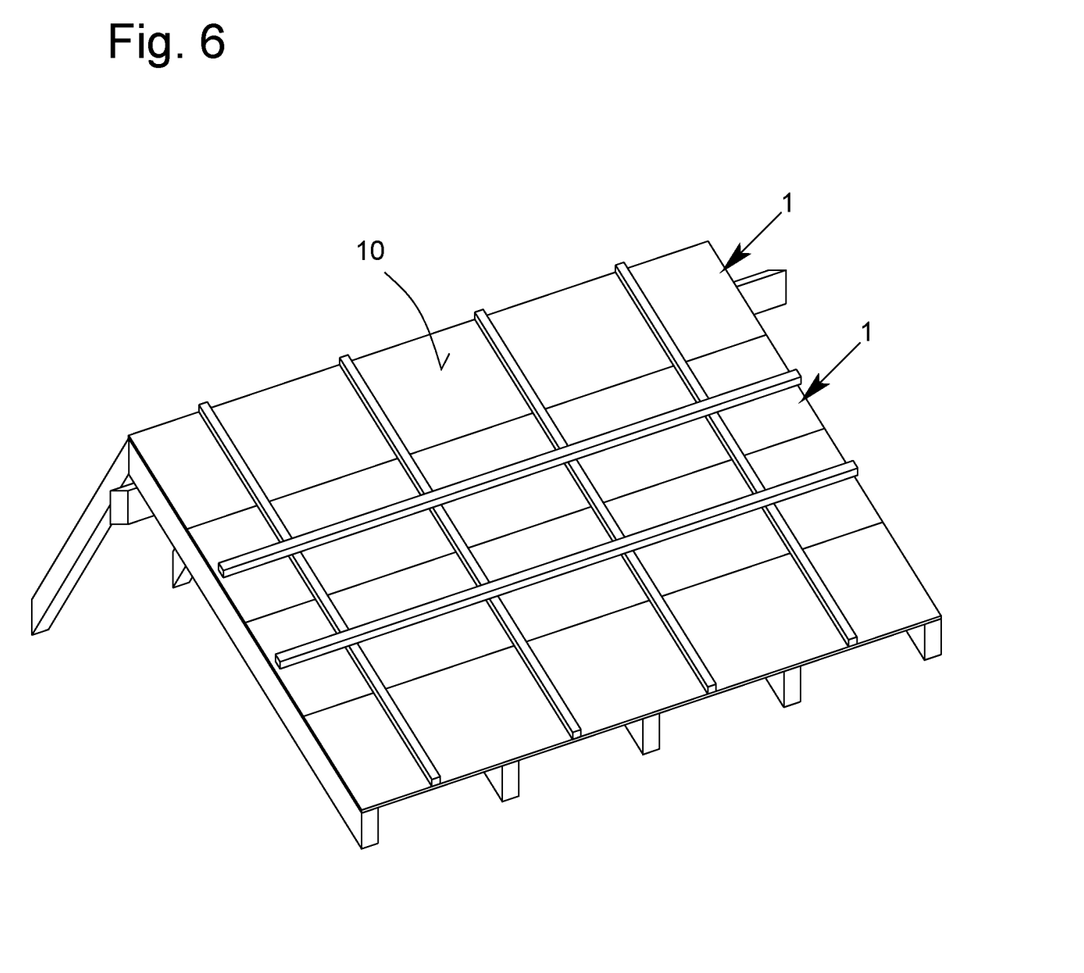
FIG. 6 shows a schematic perspective view of the laid roofing underlay according to the invention when used as a roof lining membrane.

Furthermore, FIG. 6 shows the use of the roofing underlay 1 as a roof lining membrane. The roofing underlay 1 here is arranged on a roofing structure. The individual roofing underlays 1 are joined together in water-tight manner by the adhesive areas 9 provided. The outside 10 of the roofing underlay 1 is facing toward the weather and the inside 11 of the roofing underlay 1 is facing toward the rafters.

Figure 7:
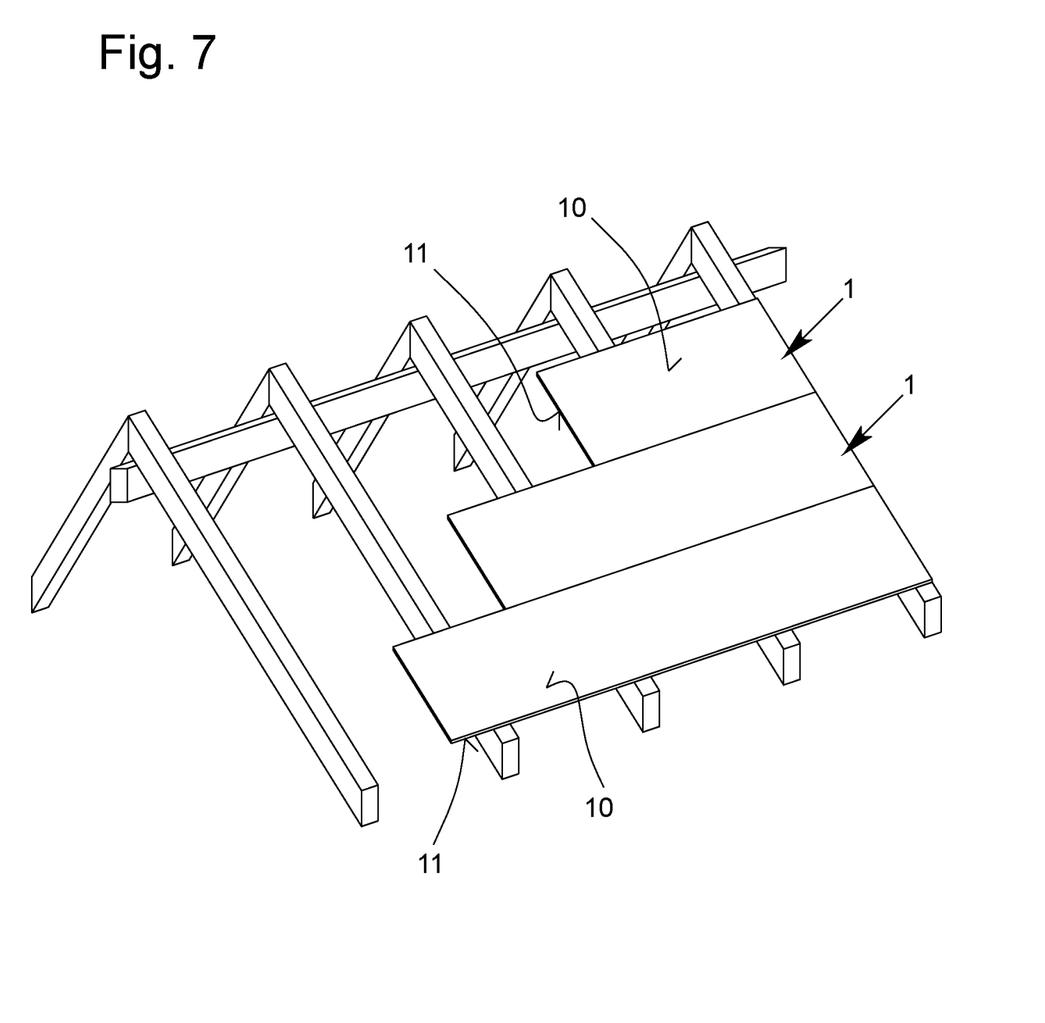
FIG. 7 shows a schematic perspective view of the roofing underlay according to the invention when used as a roof lining membrane.

Moreover, FIG. 7 illustrates the arrangement of the roofing underlay 1 on a roofing structure, wherein the inside 11 of the roofing underlay 1 faces the roofing structure.

Furthermore, a method for production of a roofing underlay 1 is provided wherein the roofing underlay 1 per FIG. 1 comprises an outer nonwoven layer 2 and an inner nonwoven layer 3. Between the outer nonwoven layer 2 and the inner nonwoven layer 3 is arranged a microporous membrane layer 4 based on a polyolefin plastic. In addition, a further membrane layer 5 based on a polyolefin plastic is arranged between the outer nonwoven layer 2 and the inner nonwoven layer 3. The membrane layers 4, 5 are separated and/or decoupled from each other by a separating layer 6.

Moreover, in an exemplary embodiment of the method (not shown), it is provided that adjacent membrane layers 4, 5 are joined together across separating layers 6 by means of to ultrasound welding and/or by bonding and/or by hot calendering. For the ultrasound welding, it is preferably provided to use punctual partial spot welds. In the version of the method where the membrane layers 4, 5 are bonded to the separating layer 6, a partial punctual bonding is provided. In an exemplary embodiment (not shown), it is provided that the adhesive and/or glue for the integral connection of the individual layers is a hot melt glue and/or a dispersion glue. The ultrasound welding is preferably performed by means of sonotrodes, which ensure single punctual welds.

In a further embodiment, the adhesive itself may be provided as the separating layer 6, wherein the separating layer 6 as an adhesive layer firmly joins together the membrane layers 4, 5.

Figure 8:
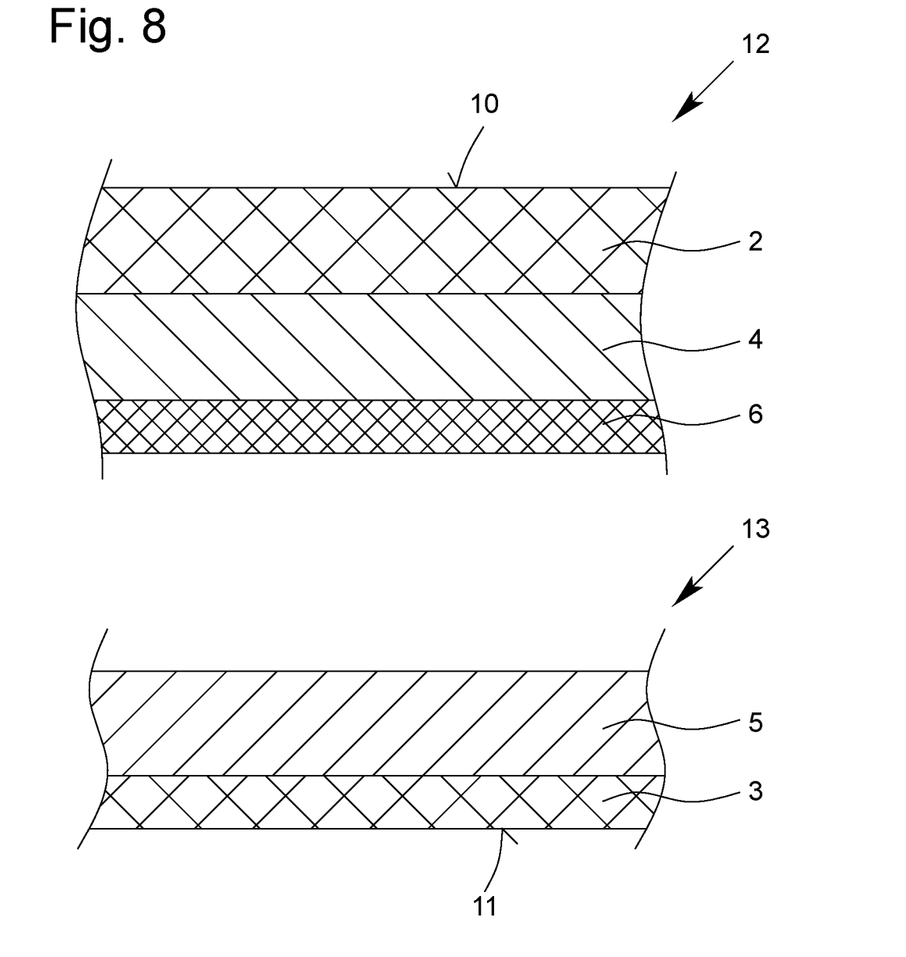
FIG. 8 shows a schematic cross sectional view of the intermediate products of the roofing underlay according to the invention before being joined together.

Schematically, FIG. 8 illustrates how, in one variant embodiment of the method, an at least three-layer construction 12 is first produced from an outer nonwoven layer 2, a membrane layer 4 and a separating layer 6. When producing the three-layer construction 12, in a further embodiment, the joining of the individual layers is done by calendering and/or ultrasound welding. Furthermore, besides the production of the at least three-layer construction 12, the production of an at least two-layer construction 13 is provided, wherein the at least two-layer construction 13 comprises a membrane layer 5 and an inner nonwoven layer 3. In a further embodiment, the at least two-layer construction 13 is preferably produced by a punctual partial bonding and/or full-surface bonding. The at least three-layer construction 12 is joined to the at least two-layer construction 13, preferably using a punctual partial bonding and/or full-surface bonding for the joining process. After combining the at least three-layer construction 12 with the at least two-layer construction 13, the roofing underlay 1 forms. When joining the at least two-layer construction 13 to the at least three-layer construction 12, the separating layer 6 of the at least three-layer construction 12 is being joined to the membrane layer 5 of the at least two-layer construction 13. Of course, in further variant embodiments of the method (not shown), different joining methods may be provided for the individual layers. Lastly, in one step of the method, the joining of all layers to form a roofing underlay 1 is carried to out, or individual layered constructions 12, 13 are produced by means of various joining techniques.

REFERENCES

1 Roofing underlay
2 Outer nonwoven layer
3 Inner nonwoven layer
4 Microporous membrane layer
5 Further membrane layer
6 Separating layer
7 Lengthwise edge
8 Lengthwise edge
9 Adhesive area
10 Outside of roofing underlay
11 Inside of roofing underlay
12 Three-layer construction
13 Two-layer construction

The invention claimed is:

1. A roofing underlay comprising:
at least one outer nonwoven layer,
at least one inner nonwoven layer, and
at least one microporous membrane layer that includes at least one polyolefin plastic, wherein the microporous membrane layer is arranged between the outer nonwoven layer and the inner nonwoven layer,
wherein
at least one additional microporous membrane layer that includes polyolefin plastic is provided between the outer nonwoven layer and the inner nonwoven layer, and in that the additional microporous membrane layer is separated from the microporous membrane layer by a nonwoven separating layer, wherein the nonwoven separating layer is water-permeable, wherein the roofing underlay is water-tight and water vapor-permeable.

2. The roofing underlay according to claim 1, wherein a plurality of additional membrane layers are provided, wherein adjacent microporous membrane layers are separated from each other by another separating layer.

3. The roofing underlay according to claim 1, wherein one or more of the microporous membrane layer and the at least one additional microporous membrane layer comprises a material based on polypropylene (PP) and/or polyethylene (PE).

4. The roofing underlay according to claim 1, wherein one or more of the microporous membrane layer and the at least one additional microporous membrane layer has a thickness in the range of 20 to 200 μm.

5. The roofing underlay according to claim 1, wherein the at least one microporous membrane layer has a grammage between 15 and 150 g/m$^2$.

6. The roofing underlay according to claim 1, wherein the thickness of the at least on microporous membrane layer facing toward the outer nonwoven layer is between 50% and 200% greater than the thickness of the at least one additional microporous membrane layer facing toward the inner nonwoven layer.

7. The roofing underlay according to claim 1, wherein the thickness of the at leak one additional microporous membrane layer facing toward the inner nonwoven layer is greater by between 50% and 200% than the thickness of the at least one microporous membrane layer facing toward the outer nonwoven layer.

8. The roofing underlay according to claim 1, wherein the outer nonwoven layer has a grammage between 20 and 200 g/m².

9. The roofing underlay according to claim 1, wherein the inner nonwoven layer has a grammage between 1 and 150 g/m².

10. The roofing underlay according to claim 1, wherein the separating layer is a nonwoven layer, a perforated foam, an open-pore foam, a foam layer, a scrim, a textile, or an adhesive applied in a filamentous structure, a fibrous structure, and/or in a grid pattern, and the separating layer has a grammage between 1 and 150 g/m².

11. The roofing underlay according to claim 1, wherein the roofing underlay is selectively permeable or water-tight, with a water column between 0.8 and 40 m.

12. The roofing underlay according to claim 1, wherein a water vapor diffusion-equivalent air layer thickness of the roofing underlay is between 0.02 and 0.5 m.

13. The roofing underlay according to claim 1, wherein one or more of the at least one outer nonwoven layer, the at least one inner nonwoven layer and the separating layer includes a plastic material, a thermoplastic material, polyester (PES), polyethylene (PE), polypropylene (PP) and/or polyethylene terephthalate (PET).

14. The roofing underlay according to claim 1, wherein adjacent membrane layers are joined to the inner or outer nonwoven layer by ultrasound welding, punctual spot welds, bonding, punctual partial bonding, and/or by hot calendering.

15. The roofing underlay according to claim 1, wherein immediately adjacent membrane layers are joined together across separating layers by ultrasound welding, punctual spot welds, bonding, punctual partial bonding, and/or by hot calendering.

16. The roofing underlay according to claim 1, wherein an adhesive area is provided on at least one edge at a bottom and/or at a top side of the roofing underlay.

17. The roofing underlay according to claim 1, wherein the roofing underlay is a roof cladding underlay or a roof lining membrane.

18. A method for production of a roofing underlay having at least one outer nonwoven layer, at least one inner nonwoven layer and at least one microporous membrane layer based on a polyolefin plastic, wherein the membrane layer is arranged between the outer nonwoven layer and the inner nonwoven layer,
wherein
at least one further microporous membrane layer based on polyolefin plastic is provided between the outer nonwoven layer and the inner nonwoven layer and the at least one further membrane layer is separated from the membrane layer by a nonwoven separating layer, wherein the nonwoven separating layer is water-permeable.

19. The method according to claim 18, wherein immediately adjacent membrane layers are joined together across separating layers by ultrasound welding, punctual partial spot welds, bonding, punctual partial bonding, and/or by hot calendering.

20. The method according to claim 18, wherein an at least three-layer construction having the at least one outer nonwoven layer, the at least one microporous membrane layer and the nonwoven separating layer, is first produced by calendering and/or ultrasound welding, and an at least two-layer construction having the at least one inner nonwoven layer and the at least one further microporous membrane layer is produced in particular by ultrasound welding, and the at least two-layer construction is then joined to the at least three-layer construction by a punctual partial bonding and/or full-surface bonding, wherein the at least one further microporous membrane layer of the at least two-layer construction is facing the nonwoven separating layer of the at least three-layer construction.

21. The method according to claim 19, wherein the ultrasound welding is performed using sonotrodes.

* * * * *

UNITED STATES PATENT AND TRADEMARK OFFICE
CERTIFICATE OF CORRECTION

| | | |
|---|---|---|
| PATENT NO. | : 11,407,198 B2 | Page 1 of 1 |
| APPLICATION NO. | : 16/497677 | |
| DATED | : August 9, 2022 | |
| INVENTOR(S) | : Flaig et al. | |

It is certified that error appears in the above-identified patent and that said Letters Patent is hereby corrected as shown below:

On the Title Page

Item (87) "PCT Pub. Date:", Column 1, Line 2, please delete "Nov. 10, 2018" and insert -- Oct. 11, 2018 --, therefore.

Signed and Sealed this
Sixth Day of December, 2022

Katherine Kelly Vidal
*Director of the United States Patent and Trademark Office*